(12) United States Patent
Urbank et al.

(10) Patent No.: US 6,262,400 B1
(45) Date of Patent: Jul. 17, 2001

(54) CONTROL METHOD FOR A RESISTANCE HEATER IN A VEHICLE HEATING SYSTEM

(75) Inventors: Thomas Martin Urbank, Lockport; Sean Michael Kelly, Churchville; Kiran R. Patel, Getzville, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/678,584

(22) Filed: Oct. 3, 2000

(51) Int. Cl.$^7$ .................................................. H05B 1/02
(52) U.S. Cl. ......................... 219/497; 219/202; 219/501; 219/203
(58) Field of Search ..................... 219/202, 203, 219/205, 494, 497, 501, 506, 508; 307/117; 374/102, 103

(56) References Cited

U.S. PATENT DOCUMENTS

| | | | |
|---|---|---|---|
| 3,868,559 | * 2/1975 | Hill et al. ................................ | 320/61 |
| 5,013,994 | * 5/1991 | Takatsuka ................................ | 322/8 |
| 5,107,094 | * 4/1992 | Kuhn et al. ............................. | 219/202 |
| 5,482,013 | * 1/1996 | Andrews et al. ....................... | 219/206 |

* cited by examiner

Primary Examiner—Mark Paschall
(74) Attorney, Agent, or Firm—Patrick M. Griffin

(57) ABSTRACT

An improved control method variably activates an electric resistance heating element in a vehicle heating system so as to maximize the heating performance without overloading the vehicle generator or discharging the vehicle storage battery. A desired activation level for the heating element is determined based at least in part on the ability of the engine driven generator to develop electrical current, and when enabled, the heating element is activated based on the desired activation level. If a load condition for which the generator is unable to charge the storage battery is detected, the activation level is progressively reduced, and when the load condition is no longer detected, the activation level is progressively increased toward the desired level.

10 Claims, 3 Drawing Sheets

CONTROL METHOD FOR A RESISTANCE HEATER IN A VEHICLE HEATING SYSTEM

TECHNICAL FIELD

This invention relates to a vehicle heating system including a resistance heater element, and more particularly to a control method for the resistance heater element.

BACKGROUND OF THE INVENTION

Cabin heating in a vehicle equipped with a water-cooled engine is ordinarily achieved by directing a portion of the engine coolant through a heat exchanger disposed in a cabin ventilation duct. The amount of coolant directed through the heat exchanger is determined based on a driver manipulated temperature control, and a motor-driven fan forces outside and/or cabin air past the heat exchanger, and into the vehicle cabin. Since this arrangement cannot deliver any significant heat to the cabin during engine warm-up, it has been suggested that the initial cabin heating could be provided through the use of electrically activated heating elements. It is typically envisioned that such elements would be installed in the vehicle heating, ventilation and air conditioning system, and activated for a timed period after engine start up. However, the use of electrical heating elements has not gained wide acceptance, primarily due to the relatively high electrical current required and the inability of an engine driven generator to supply high current under engine idle conditions. Under many operating conditions, alternator overloading and/or battery discharging can occur.

SUMMARY OF THE INVENTION

The present invention is directed to an improved control method for an electrically activated resistive heating element in a vehicle heating system wherein the heating element is activated to maximize its heating performance without overloading the alternator or discharging the vehicle storage battery. A desired activation level for the heating element is determined based at least in part on the ability of the engine driven generator to develop electrical current, and when enabled, the heating element is activated based on the desired activation level. If a load condition for which the generator is unable to charge the storage battery is detected, the activation level is quickly reduced, and when the load condition is no longer detected, the activation level is quickly returned to the desired level.

DESCRIPTION OF THE PREFERRED EMBODIMENT

Figure 1:
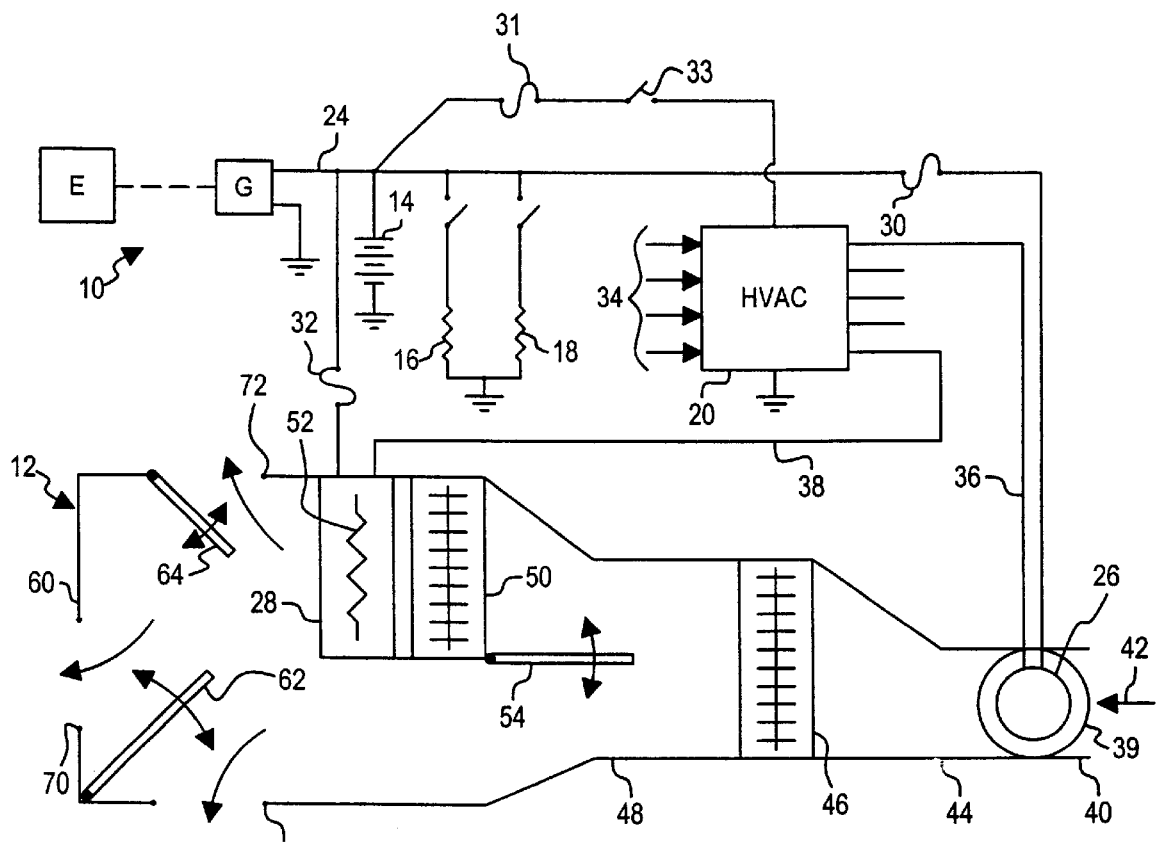
FIG. 1 is a schematic diagram of a vehicle heating system according to this invention, including a resistive heating element and a control module.

Referring to FIG. 1, the reference numeral 10 generally designates a vehicle engine and electrical system, while the reference numeral 12 generally designates a vehicle cabin ventilation system. The engine E is mechanically coupled to drive a generator (or alternator) G, which supplies current to storage battery 14 and electrical loads 16, 18 via line 24 during operation of engine E. The electrical loads 16, 18 are typically switched, as shown, and are representative of conventional automotive loads such as headlamps, rear window defogger, and so on. The electrical loads most relevant to the present invention, however, are the control module 20, and the blower motor 26 and electrical heating unit 28 of cabin ventilation system 12. As illustrated, these loads are typically coupled to line 24 via fuses 30, 31, 32, and via ignition switch 33 in the case of control module 20. The control module 20 contains suitable switching devices for selectively establishing ground paths for the respective loads 26, 28 when their activation is desired. The illustrated control module 20 is adapted to carry out the control method of this invention, and may be configured in the form of a suitably programmed but otherwise conventional Heating, Ventilation and Air Conditioning Controller (HVAC). The control module 20 receives various input signals 34 representative of driver settings and system operating parameters, and provides a number of outputs, including the lines 36 and 38 which are coupled to blower motor 26 and electrical heating unit 28, respectively.

The blower motor 26 and electric heating unit 28 form part of the cabin ventilation system 12, as indicated. The blower motor 26 drives an air inlet blower 39 that is housed in an air intake duct 40 adapted to receive outside and/or cabin air as indicated by the arrow 42. A duct 44 downstream of blower 39 directs the air through air conditioning evaporator 46, which is supplied with chilled refrigerant for the purpose of cooling and dehumidifying the inlet air. A duct 48 downstream of evaporator 46 houses two heating elements: the electrical heating unit 28 and a heater core 50. The heater core 50 is formed as an array of finned tubes conducting engine coolant, whereas the electrical heating unit 28 contains one or more resistive heating elements, signified by the reference numeral 52. The resistive heating elements 52 are typically electro-ceramics with a positive-temperature-coefficient material containing barium titanate doped with lead or yitrium, or a positive-temperature-coefficient wire embedded in a ceramic matrix, but other types of resistive heating elements may be used instead. The heating unit 28 and heater core 50 effectively bifurcate the duct 48, and a re-heat door 54 is adjustable as shown to control how much of the air must pass through heating unit 28 and heater core 50. The heated and un-heated air portions are mixed in a plenum portion 60 of duct 48 downstream of re-heat door 54, and a pair of mode control doors 62, 64 direct the mixed air through one or more outlets, including a defrost outlet 68, a panel outlet 70, and a heater outlet 72. The mode control door 62 is adjustable as shown to switch the outlet air between the defrost and panel outlets 68, 70, and the mode control door 64 is adjustable as shown to control airflow through the heater outlet 72.

FIGS. 2–5 describe a control method carried out by control module 20 of FIG. 1 for controlling the operation of heating unit 28 according to this invention. Mechanization details for carrying out the control method will be well known to those skilled in the art; for example, the control method may be carried out in hardware or software, or various combinations thereof.

In general, the control of this invention involves variably activating the heating unit 28 in accordance with a desired activation level PWMdes based on heating requirements and the ability of the generator G to produce electrical current, and progressively reducing the activation level if the control module 20 detects a specified load condition for which generator G is unable to supply charging current to storage battery 14. If an electrical fault or system override condition is detected, heater activation is interrupted. In the illustrated embodiment, variable activation of heating unit 28 is achieved by pulse-width-modulation (PWM) of a semiconductor switching device 80 connected in the ground path of heating element 52; see FIG. 2. Block 82 determines if heating activation is enabled, and blocks 84–86 determine a requested activation level DCreq, which is applied to Slow Ramp block 90 via switch block 88 when activation is enabled. Block 92 determines a generator capacity limit GCL based on engine speed ES, and block 94 sets the desired activation level DCdes according to the minimum of GCL and the output of Slow Ramp block 90. Normally, the desired activation level DCdes is applied to Fast Ramp block 100 via switch block 98 to form a duty cycle command DCcmd for PWM generator 102. However, if block 96 detects a load condition for which generator G is unable to charge storage battery 14 (referred to herein as an electrical load override ELO condition), switch block 98 applies a 0% duty cycle input to Fast Ramp block 100. Ordinarily, PWM generator 102 supplies a gate drive signal to switching device 80 via switch block 106, but the conduction of switching device 80 is immediately interrupted if block 104 detects a fault/system override condition.

The requested activation level DCreq is determined by blocks 84–86 based on the engine coolant temperature CT. The block 84 represents a calibrated look-up function that develops a coolant temperature offset CTO based on coolant temperature CT, and the summation block 86 develops the requested activation level DCreq according to the difference (DCmax−CTO), where DCmax represents the highest activation level (which may be 100%, for example) for heating element 52. Alternatively, DCmax may be variable based on the setting of an operator-manipulated temperature selector. As indicated at block 84, the coolant temperature offset CTO is zero when the engine coolant temperature CT is below a certain value (such as 140° F.), and then progressively increases to a maximum value as CT rises above 140° F. In most applications, the maximum value of coolant temperature offset CTO will be equal to DCmax; however, in applications where electric heater activation may be required even after engine warm-up, the maximum value may be calibrated to a value less than DCmax.

The Activation Enable block 82 is responsive to a number of inputs including signals representative of outside air temperature (OAT), ON/OFF switch state, and blower motor current IBL, and is described in further detail below in reference to FIG. 3. When block 82 determines that activation should be enabled, it generates an enable output (EN) on line 108. The enable output EN controls the state of switch block 88, through which the requested activation level (DCreq) is applied to Slow Ramp block 90. As indicated, the switch block 88 is configured to output 0% duty cycle when the enable signal EN signifies a disable condition, and to output the requested duty cycle DCreq when enable signal EN signifies that heater activation is enabled. The Slow Ramp block 90 limits the rate at which the requested duty cycle DCreq can change to a predetermined rate of change (i.e., ramp rate) with respect to time, such as 10%–50% duty cycle/sec. Thus, when activation is initially enabled, the output of Slow Ramp block 90 progressively increases at the slow ramp rate from 0% duty cycle to the requested duty cycle DCreq; and when activation is subsequently disabled, the output of Slow Ramp block 90 progressively decreases at the slow ramp rate to 0% duty cycle.

The generator capacity limit (GCL) is determined by block 92 as a function of engine speed ES. As indicated at block 92, GCL has a minimum value when engine speed ES is at or below an idle value such as 800 RPM, and then progressively increases with increasing engine speed, reaching a maximum value for engine speeds above a calibrated value such as 2000 RPM. In this way, the generator capacity limit GCL reflects the ability of the generator G to produce current, and due to the action of block 94, limits the desired activation level DCdes to a value that will prevent generator overloading.

The Electrical Load Override (ELO) condition is determined by comparator block 96, which compares the battery terminal voltage VBAT to a voltage reference VREF (such as 13–13.5 VDC). If VBAT is below VREF, generator G is not charging battery 14, and block 96 signals the switch block 98 to supply a 0% duty cycle input to Fast Ramp 100. In this case, activation of electric heating is prevented, or if already activated, the activation level is reduced at a fast ramp rate (block 100), such as 100% duty cycle/second, so long as the condition persists. If VBAT is above VREF, the generator G is charging battery 14, and block 96 signals switch block 98 to apply the desired activation level DCdes to Fast Ramp 100.

The Fault/System Override block 104 is responsive to a number of inputs including signals representative of the ON/OFF switch state, a Load Shed indicator and the current IFET, and is described in further detail below in reference to FIG. 4. As indicated, the signal IFET represents the current through switching device 80, and may be obtained based on the voltage across switching device 80 when switching device 80 is a MOSFET as shown. When it is determined that activation of heating element 52 should be interrupted, the INT output of block 104 becomes active, causing the switch block 106 to ground the gate terminal of switching device 80; otherwise, switch block 106 couples the gate terminal to the output of PWM generator 102.

Figure 3:
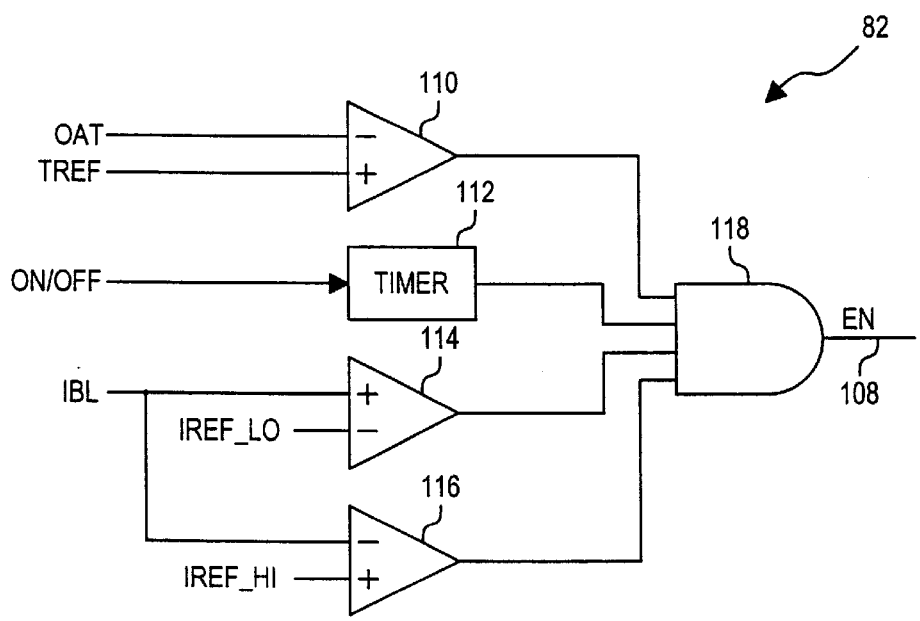
FIG. 3 is a block diagram detailing a portion of the block diagram of FIG. 2 concerning enable conditions for activating the resistive heating element.
Figure 2:
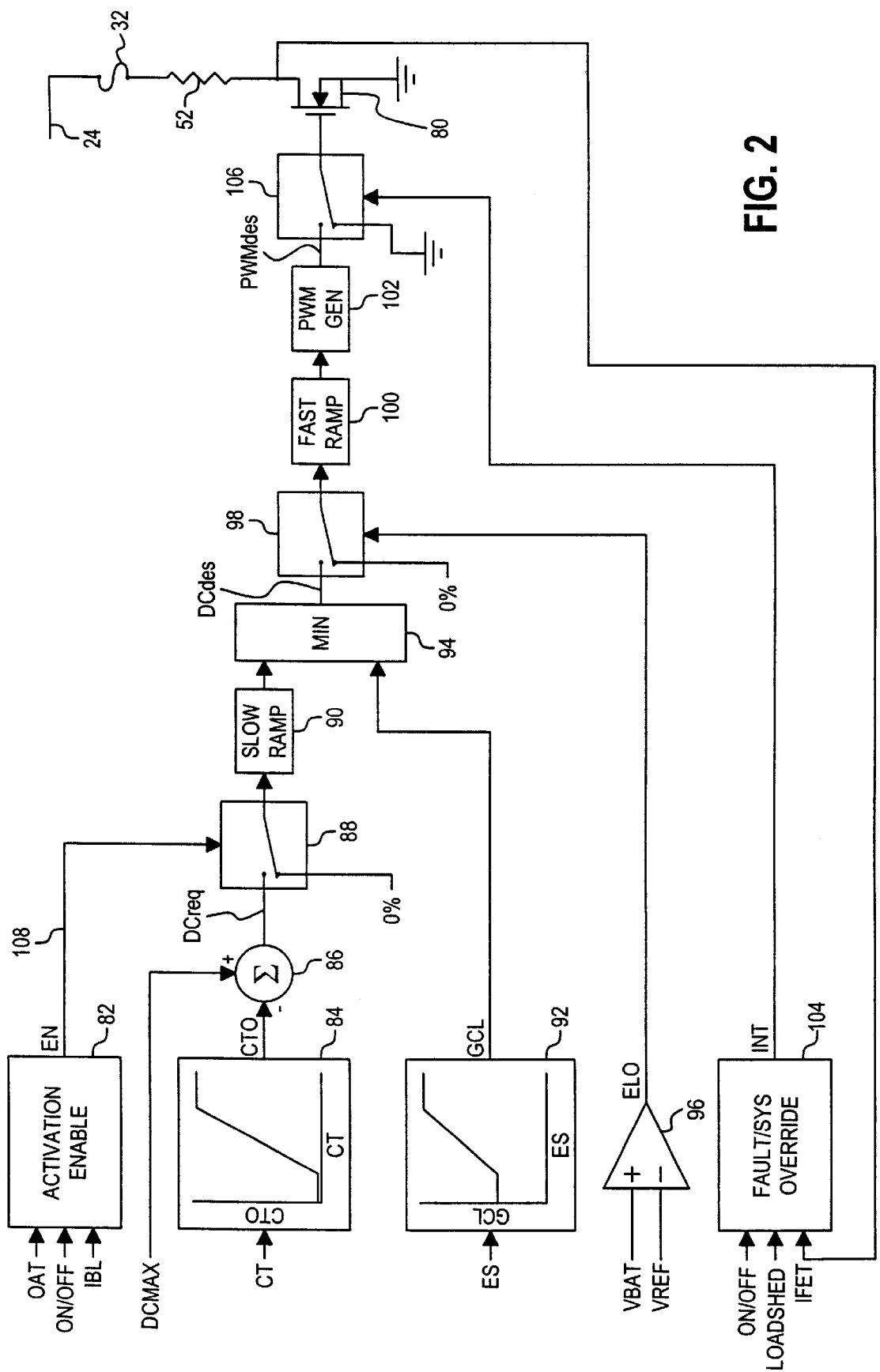
FIG. 2 is a block diagram of the control method of this invention, as carried out by the control module of FIG. 1.

Referring to FIG. 3, the Activation Enable block 82 is configured to check a number of conditions, all of which must be satisfied to activate the enable output EN on line 108. The block 110 compares the outside air temperature OAT with a temperature reference TREF (such as 60° F.), and generates a logic one output when OAT<TREF. That is, activation of electric heating is enabled if the outside air temperature is below TREF. The Timer block 112 (which may be omitted in certain applications) is activated when the ON/OFF switch input changes from OFF to ON, and produces a logic one output for a predetermined interval (such as 10–20 minutes) thereafter. The timed interval thereby establishes a limit on the duration of electric heating. The blocks 114 and 116 respectively compare the blower motor current IBL to low and high current references IREF_LO and IREF—HI corresponding to the normal motor current levels for the lowest and highest blower motor speed selections. Block 114 produces a logic one output if IBL>IREF_LO, and block 116 produces a logic one output if IBL<IREF_HI. That is, electric heating is enabled if IBL is in a normal range, and disabled if IBL is outside the normal range. Finally, the outputs of blocks 110–116 are applied as inputs to the AND-gate 118 to form the enable output EN on line 108. In some applications, blower motor voltage may be measured instead of blower motor current to detect comparable conditions.

Figure 4:
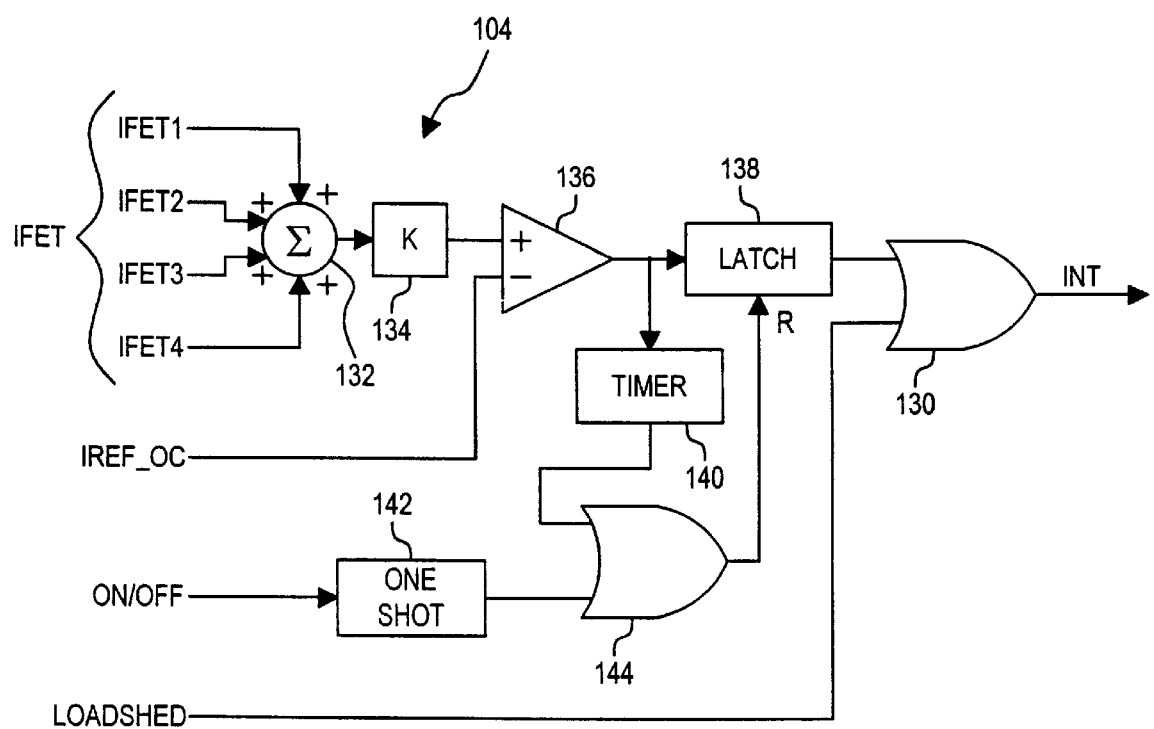
FIG. 4 is a block diagram detailing a portion of the block diagram of FIG. 2 concerning fault and/or system override conditions for interrupting activation of the resistive heating element.

Referring to FIG. 4, the Fault/System Override block 104 is configured to test for two possible override conditions—load-shed and over-current—and to activate the interrupt output INT if either condition occurs. A load-shed override condition is externally produced, typically during wide-open throttle or very low speed conditions of engine E. The condition is signified by the status of the Load-Shed input signal, which is applied as an input to OR-gate 130. An over-current condition occurs when the sensed switching device current IFET exceeds an over-current threshold IREF_OC. The various signals summed in block 132 (IFET1, IFET2, IFET3, IFET4) represent the current detected in individual switching devices such as the device 80 in FIG. 2. This reflects the fact that multiple heating elements may be used in a typical automotive application. The summed current is multiplied by a gain factor K at block 134, and compared to IREF_OC at block 136. If the summed current exceeds IREF_OC, the block 136 triggers the Latch 138 to provide a logic one input to OR-gate 130. The blocks 140–144 are configured to reset the Latch 138, either a predetermined time after the over-current condition is identified, or after the ON/OFF switch is cycled. Thus, the reset (R) input of Latch 138 is coupled to the output of OR-gate 144, which receives inputs from Timer block 140 and One-Shot 142. The Timer 140 triggers the latch reset a predetermined period of time after the over-current condition is detected, and the One-Shot 142 triggers the latch reset for a predetermined period of time after the ON/OFF switch is cycled.

In summary, the control of the present invention variably activates an electric resistance heating element in a manner that maximizes its heating performance without overloading the generator G or discharging the storage battery 14. Activation of the heating element only occurs when the activation enable conditions have been met, whereafter the heating element is activated at a duty cycle that slowly increases (slow ramp rate+fast ramp rate) to a requested level based on engine coolant temperature, but limited by the generator capacity limit GCL. If the enable conditions are no longer met, the activation level slowly decreases to zero to smoothly terminate electrical heating. If during activation of the heating element, the generator capacity limit GCL falls due to a reduction in engine speed, the activation level is quickly reduced (fast ramp rate) to a level consistent with the ability of the generator G to produce current. Similarly, if electrical loading in the vehicle increases to the point where the generator G is unable to charge battery 14, an Electrical Load Override condition is detected, and the activation level is quickly reduced (fast ramp rate) to zero. When generator G is again able to charge battery 14, the activation level is quickly returned to the desired level DCdes. Thus, the activation level of the electric heating is cycled as required to maintain charging of battery 14 by generator G under conditions of heavy electrical loading. Limiting the rate of change in activation level prevents sudden loading and un-loading of the electrical system 10 which can stress various components and cause noticeable changes in headlamp intensity, for example. On the other hand, an immediate de-activation of electrical heating is provided if a fault/system override condition (such as over-current or load shed) is detected.

While the present invention has been described in reference to the illustrated embodiment, it is expected that various modifications in addition to those mentioned above will occur to those skilled in the art. Thus, it will be understood that control methods incorporating these and other modifications may fall within the scope of this invention, which is defined by the appended claims.

What is claimed is:

1. A control method for a vehicle heating system including a resistive heating element that is electrically activated when enabled to heat a passenger compartment of the vehicle, the vehicle having a storage battery for activating vehicle electrical loads including said resistive heating element and a generator for supplying electrical current to charge said storage battery and activate said electrical loads during operation of a vehicle engine, the control method comprising the steps of:

determining a desired activation level for said heating element based at least in part on a estimated ability of the generator to supply electrical current;

when electrical heating is enabled, activating the heating element at an activation level based on said desired activation level;

detecting a load condition for which the generator is unable to charge the storage battery during activation of said heating element; and adjusting the activation level of said heating element in response to the detection of said load condition by progressively reducing said activation level so long as said load condition is detected, and then progressively increasing said activation level toward said desired activation level once said load condition is no longer detected.

2. The control method of claim 1, wherein the ability of the generator to supply electrical current is estimated based on a measured speed of said vehicle engine.

3. The control method of claim 1, wherein heat from an engine coolant is supplied to the passenger compartment during engine operation, and said desired activation level is additionally based on a measured temperature of said coolant.

4. The control method of claim 1, wherein said desired activation level is determined according to the lesser of a limit activation level based on the estimated ability of the generator to supply electrical current and a requested activation level.

5. The control method of claim 4, wherein heat from an engine coolant is supplied to the passenger compartment during engine operation, and said requested activation level is determined according to a difference between a heat request signal an estimate of the heat available from said engine coolant.

6. The control method of claim 4, including the step of:
setting the requested activation level to zero when electrical heating is not enabled.

7. The control method of claim 4, including the step of:
limiting a rate of change of said requested activation level to no more than a predetermined ramp rate.

8. The control method of claim 1, wherein the heating system includes a blower motor for moving air across said heating element, the control method including the step of:

enabling electrical heating when requested by a vehicle occupant, provided that an outside air temperature is less than a calibrated temperature threshold and said blower motor is operating within a prescribed range of operation.

9. The control method of claim 1, wherein said load condition is detected when a terminal voltage of said storage battery is less than a predetermined voltage.

10. The control method of claim 1, including the step of:
interrupting activation of said heating element in response to a detected heating element over-current condition.

\* \* \* \* \*